United States Patent [19]
Fisher et al.

[11] Patent Number: 5,237,593
[45] Date of Patent: Aug. 17, 1993

[54] SEQUENCE SYNCHRONISATION

[75] Inventors: David A. Fisher, Saffron; Simon D. Brueckheimer, London, both of Great Britain

[73] Assignee: STC, PLC, London, England

[21] Appl. No.: 517,255

[22] Filed: May 1, 1990

[30] Foreign Application Priority Data

May 4, 1989 [GB] United Kingdom ............... 8910254
Jan. 11, 1990 [GB] United Kingdom ............... 9000604
Mar. 7, 1990 [GB] United Kingdom ............... 9005073

[51] Int. Cl.$^5$ .................................................. H04L 7/00
[52] U.S. Cl. ............................................ 345/115; 380/43; 380/44; 375/116; 371/47.1
[58] Field of Search ...................... 375/1, 115, 116; 380/43, 44; 455/1; 371/47.1

[56] References Cited

U.S. PATENT DOCUMENTS

| | | | |
|---|---|---|---|
| 3,648,237 | 3/1972 | Freu, Jr. et al. | 371/47.1 X |
| 3,753,228 | 8/1973 | Nickolas et al. | 371/47.1 |
| 3,914,740 | 10/1975 | Han | 371/47.1 |
| 4,383,322 | 5/1983 | Halpein | 395/1 |
| 4,736,424 | 4/1988 | Busby | 380/15 |
| 4,771,463 | 9/1988 | Beeman | 380/46 |
| 4,790,013 | 12/1988 | Kage | 375/115 X |
| 5,003,552 | 3/1991 | Mower | 375/115 X |

FOREIGN PATENT DOCUMENTS

| | | |
|---|---|---|
| 1190904 | 6/1970 | United Kingdom . |
| 1512925 | 6/1978 | United Kingdom . |
| 2005116 | 4/1979 | United Kingdom . |

*Primary Examiner*—Curtis Kuntz
*Assistant Examiner*—Tesfaldet Bocure
*Attorney, Agent, or Firm*—Lee, Mann, Smith, McWilliams, Sweeney & Ohlson

[57] ABSTRACT

A first (receiver), for example, pseudo random binary sequence (PRBS) generator (6) is synchronized with a second identical PRBS generator (2) at a tramsitter by adding a PRBS (u(x)) to a data stream (w(x)). The data stream includes a known value at periodic intervals. The received data is framed (5) and thus the position of the known data values determined. The received data is sampled at these positions to produce a sequence of samples (s(x)) comprising a sampled version of the transmitter PRBS. The phase of the transmitter generator (2) is determined for the samples and the phase of the receiver generator (6) adjusted to correspond. (FIG. 1). Implementation with sequence generators other than binary sequence generators are also discussed.

28 Claims, 10 Drawing Sheets $x^{23} + x^{18} + 1$ m = CELL LENGTH = 424 BITS $x^{23} + x^{18} + 1$

CELL LENGTH = 424 BITS

SEQUENCE SYNCHRONISATION

BACKGROUND OF THE INVENTION

This invention relates to methods of pseudo random sequence synchronisation and apparatus for use therein.

SUMMARY OF THE INVENTION

According to one aspect of the present invention there is provided a method of synchronising a first sequence generator, obeying a generator polynomial whose coefficients and operators are defined over a Galois Field, disposed at a data receiver with a second identical sequence generator disposed at a data transmitter, including the step of adding the sequence produced by the second generator to a data stream for transmission from the transmitter to the receiver, which data stream includes a predictable data value at intervals, framing the received data and thus determining the interval and the positions of the predictable data values, and sampling the received data at said positions, the resultant sequence of samples comprising a sampled version of the sequence produced by the second generator, determining the phase of the second generator from the sequence of samples and adjusting the phase of the first generator to correspond to that of the second generator, which method serves also for automatically determining at said data receiver whether said data transmitter has applied its sequence generator.

According to another aspect of the present invention there is provided a method of synchronising a first sequence generator, obeying a generator polynomial whose coefficients and operators are defined over a Galois Field, disposed at a data receiver, with a second identical sequence generator disposed at a data transmitter, including the step of adding the sequence produced by the second generator to a data stream for transmission from the transmitter to the receiver, which data stream includes predictable data values at intervals, which data stream includes framing information at intervals, which framing information constitutes predictable data values, by statistical means, concurrently framing the received data and determining the phase of the second generator and sampling the received data framing information, and thus possibly determining the interval and the positions of predictable data values, and sampling the received data at said positions, the resulting sequence of samples comprising a sampled version of the sequence produced by the second generator, determining the phase of the second generator from the sequence of samples and adjusting the phase of the first generator to correspond to that of the second generator, which method serves also for automatically determining at said data receive whether said data transmitter has applied its sequence generator.

According to a further aspect of the present invention there is provided a method of synchronising a first pseudo random binary sequence (PRBS) generator disposed at a data receiver with a second identical PRBS generator disposed at a data transmitter, including the steps of adding PRBS produced by the second generator to a data stream for transmission from the transmitter to the receiver, which data stream includes a known data value at periodic intervals, framing the received data with a frame of that period and thus determining the positions of the known data values, and sampling the received data at said positions, the resultant sequence of samples comprising a sampled version of the PRBS produced by the second generator, determining the phase of the second generator from the sequence of samples and adjusting the phase of the first generator to correspond to that of the second generator.

According to another aspect of the invention there is provided apparatus for synchronising a first sequence generator, obeying a generator polynomial whose coefficients and operators are defined over a Galois field, disposed at a data receiver with a second identical sequence generator disposed at a data transmitter, including means for adding the sequence produced by the second generator to a data stream for transmission from the transmitter to the receiver, which data stream includes a predictable data value at intervals, means for framing the received data and thus determining the interval and the positions of the predictable data values, means for sampling the received data at said positions, the resultant sequence of samples comprising a sampled version of the sequence produced by the second generator, means for determining the phase of the second generator from the sequence of samples and means for adjusting the phase of the first generator to correspond to that of the second generator.

According to yet another aspect of the invention there is provided apparatus for synchronising a first sequence generator, obeying a generator polynomial whose coefficients and operators are defined over a Galois field, disposed at a data receiver, with a second identical sequence generator disposed at a data transmitter, including means for adding the sequence produced by the second generator to a data stream for transmission from the transmitter to the receiver, which data stream includes predictable data values at intervals, which data stream includes framing information at intervals, which framing information constitutes predictable data values, statistical means for concurrently framing the received data and determining the phase of the second generator and sampling the received data framing information, and thus possibly determining the interval and the positions of predictable data values, means for sampling the received data at said positions, the resulting sequence of samples comprising a sampled version of the sequence produced by the second generator, means for determining the phase of the second generator from the sequence of samples and means for adjusting the phase of the first generator to correspond to that of the second generator.

According to still a further aspect of the invention there s provided apparatus for synchronising a first pseudo random binary sequence (PRBS) generator disposed at a data receiver with a second identical PRBS generator disposed at a data transmitter, including means for adding a PRBS produced by the second generator to a data stream for transmission from the transmitter to the receiver, which data stream value includes a known data value at periodic intervals, means for framing the received data with a frame of that period and thus determining the positions of the known data values, means for sampling the received data at said positions, the resultant sequence of sample comprising a sampled version of the PRBS produced by the second generator, means for determining the phase of the second generator from the sequence of samples and means for adjusting the phase of the first generator to correspond to that of the second generator.

BRIEF DESCRIPTION OF THE DRAWINGS

Embodiments of the invention will now be described with reference to the accompanying drawings, in which.

DESCRIPTION OF THE PREFERRED EMBODIMENT

In order to scramble a transmitted binary data signal, a pseudo random binary sequence (PRBS) produced by a PRBS generator at the transmitter may be modulo-2 added, for example, to the data signal. To descramble the signal at the receiver, the phase of the modulo-2 added PRBS must be recovered in order to synchronise an identical PRBS generator at the receiver. To achieve this it has previously been necessary to reset the remote (transmitter) PRBS generator and to add a known synchronisation word (of several bits) to the transmitted data.

In the synchronisation techniques described hereinafter a pseudo random binary sequence (PRBS) from a first (transmitter) PRBS generator 2 (FIG. 1) is added to a binary data stream in a data transmitter and an identical PRBS from a second PRBS generator 6 (FIG. 1) in the receiver is synchronised therewith without the need to interrupt or reset the PRBS generators. The technique is particularly advantageous when combined with the use of a cyclic redundancy code for delimiting framing information as described in our co-pending patent Application No. 8910255.2 (Ser. No. ???) (S. D. Brueckheimer 1), the contents of which are incorporated herein by reference but can be applied with other framing methods.

The implementation described rely on the introduction or existence of known or predictable data values in the transmitted data sequence prior to addition of the PRBS. This results in particular values of the remote transmitter (first) PRBS generator 2 being known at specific points in time by the receiver, which values form sufficient information to synchronise the second PRBS generator 6 which is local to the receiver.

A specific application of the technique is the case of asynchronous time multiplexed (ATM) data. In this case the data is in the form of cells of uniform length L bits, having a header of length n bits and a payload of length j bits and where the known data value, for example binary 0, occurs at the ith bit from the start of each cell. Thus only a single bit is used.

Figure 1:
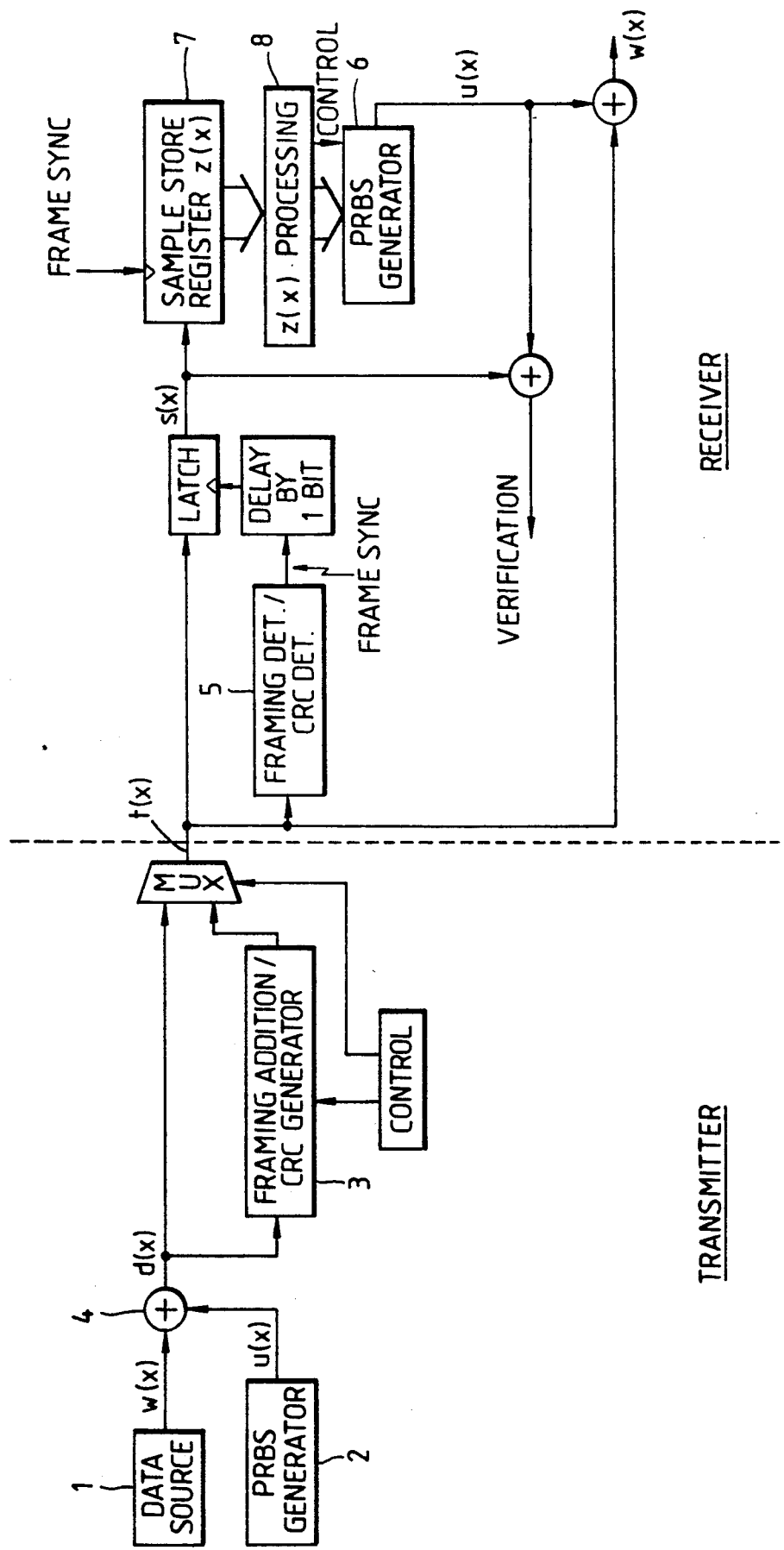
FIG. 1 illustrates schematically apparatus for performing PRBS (pseudo random binary sequence) synchronisation.

In the schematic arrangement illustrated in FIG. 1, at the transmitter a binary data stream w(x) is produced by a data source 1, the first PRBS generator 2 generates a sequence u(x) and framing information is provided by framing addition/CRC (cyclic redundancy check) generator 3.

The data sequence w(x) consists of any data sequence but having the special property that at periodic intervals there is a known data bit e.g. every ith data sample is set to binary 0.

Figure 2:
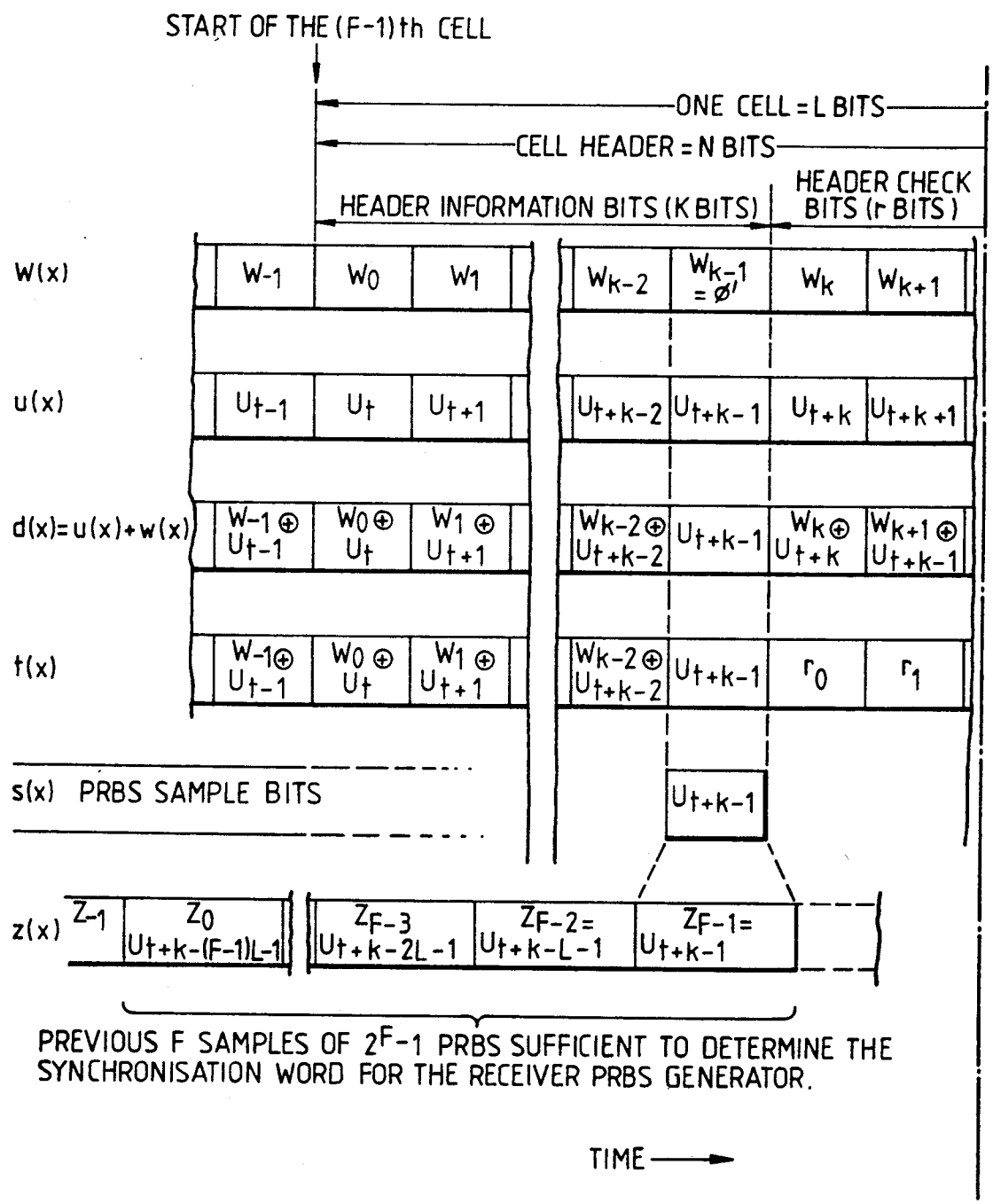
FIG. 2 illustrates frame format and constructions.
Figure 2:
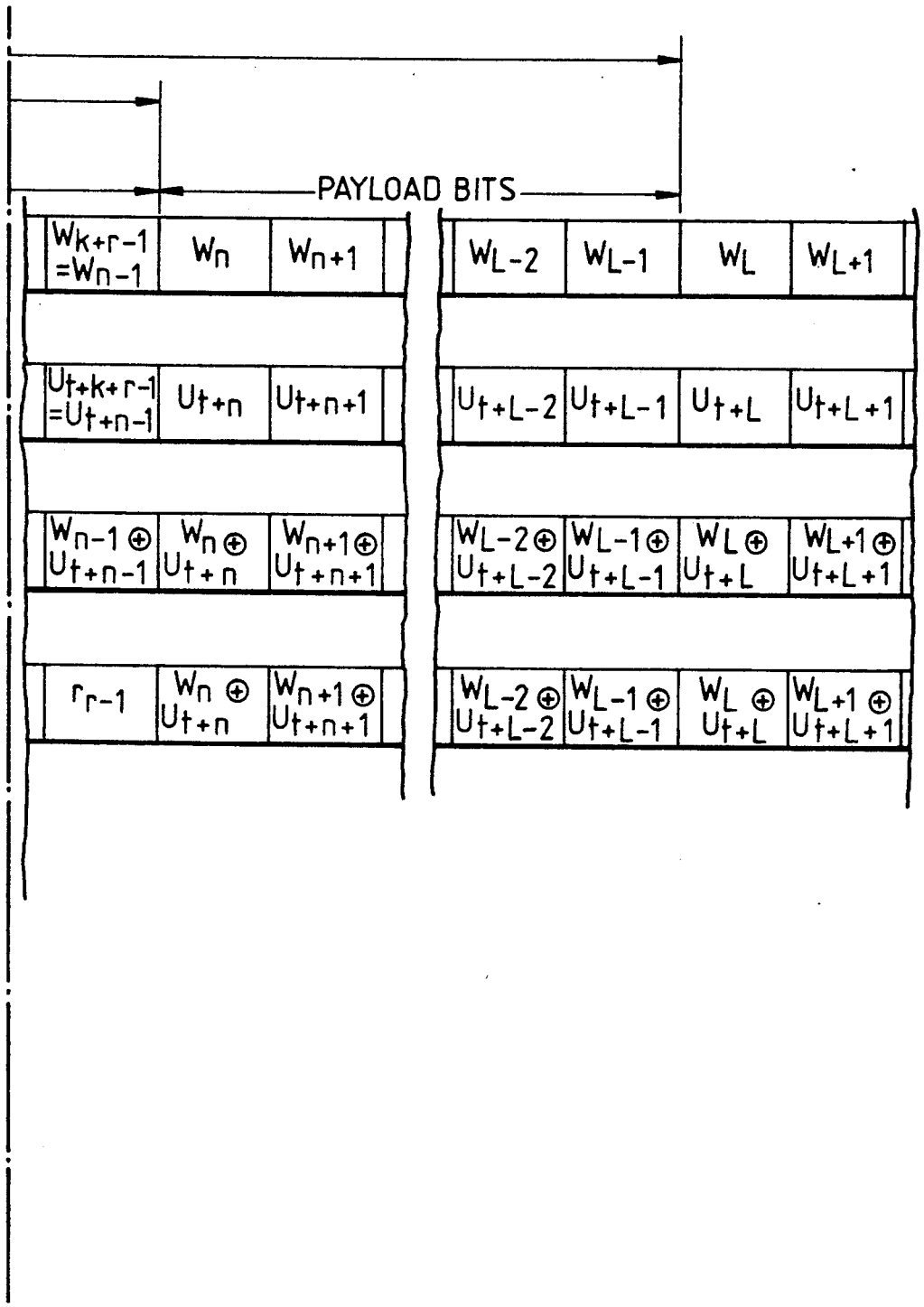

In the example illustrated in FIG. 2 w(x) is the data (header and payload). This contains null information in the field w(k)=0 to w(k+r−1) that can be overwritten with a CRC check without destroying valid data elements. An alternative approach is to insert the CRC bits at a particular point in the cell rather than overwriting them. The known data element (value binary 0) is placed in the header at position w(k−1), for this example The transmitter PRBS generator 2 generates a sequence u(x) depending on the PRBS generator polynomial 1+f(x) of degree F according to the expression $$u(x)=1/(1+f(x))$$

The sequence u(x) is then added (modulo 2) using an exclusive OR gate 4 to the data sequence w(x). No particular phase relationship is required between the start of the PRBS sequence cycle and the start of a cell.

The output of OR gate 4 is the data sequence d(x), where $d(x)=w(x)\oplus u(x)$.

CRC check bits r(x) are added to d(x) at the appropriate position to form the transmitted data sequence t(x), where $t(x)=r(x)\oplus d(x)$. The CRC is calculated by division of a polynomial representation of the data sequence d(x) by the code generator polynomial g(x) using a feedback shift register arrangement.

For the n bits of the headers d(x) is a linear systematic code. The first k bits comprise the information and the latter r=n−k bits are the CRC bits.

Let i(x) be a valid code word of the linear systematic code, let g(x) be the generator polynomial for the code, and let q(x) be some quotient resulting from the division of the header data d(x) by the generator polynomial g(x), then $$i(x)=x^{n-k}d(x)\oplus r(x) \text{ and}$$

$$r(x)=g(x)q(x)\oplus x^{n-k}d(x)$$

PRBS synchronisation in the receiver will now be considered. It is assumed for the following explanation, that the data is received substantially free from error. Framing is applied (at 5) to the data t(x) to delimit cell boundaries using, for example, the CRC framing technique of the aforementioned Patent Application. Following this process the position of the data elements $w_i$ of the known PRBS is known and these samples may be extracted to form a sequence s(x) of frequency 1/L.

s(x) is a sampled version of the remote (first) PRBS generator 2; interval m=L, for a PRBS length greater than L, otherwise interval m=L modulo $2^F-1$ for a PRBS length less than L. s(x) consists of samples of the PRBS or 'null sequence' of the remote linear feedback shift register. At the point in time that the Fth sampled value of the PRBS sequence is received (free from error) there is sufficient information to synchronise the local (second) PRBS generator (although in certain cases it may be achieved earlier).

There are various methods which can be used to synchronise the local (second) PRBS generator 6 given the sampled stream s(x).

In a first method the direct relationship between the sampled values s(x) and the remote (first) PRBS generator 2 state is used. In this case the values s(x) are stored in a register z(x) of length F (register 7). These values form a vector which when multiplied by an appropriate mapping matrix will produce a vector for a future time $t+\tau$, such that after $\tau$ the local/receiver (second) PRBS generator 6 can be clocked continuously in synchronism with that of the remote PRBS generator.

Thus at time $t+\tau$ relative to the receipt of the latest sampled PRBS element $z_{(F-1)}$ at time t, the column vector $u_{t+\tau}$ is given by the matrix multiplication.

$$Z(t)\ V(\tau) = U(t + \tau) \text{ i.e.}$$

$$[z_0\ z_1\ z_x \ldots z_{F-1}] \cdot \begin{bmatrix} v_{00} & v_{01} & v_{02} & \ldots & v_{0(F-1)} \\ v_{10} & v_{11} & v_{12} & \ldots & v_{1(F-1)} \\ v_{20} & & & & \\ \cdot & & & & \\ \cdot & & & & \\ \cdot & & & & \\ v_{(F-1)0} & v_{(F-1)1} & \ldots & \ldots & v_{(F-1)(F-1)} \end{bmatrix} = \begin{bmatrix} u_0 \\ u_1 \\ \\ \\ \\ \\ u_{F-1} \end{bmatrix}$$

Each column $V_j$ in the matrix, when multiplied by the sampled PRBS row vector $[z_0\ z_1\ z_2 \ldots z_{F-1}]$ gives the value for the local receiver PRBS generator element $u_j$ for j=0 to F−1 at time $t-\tau$.

The coefficients of the mapping matrix take values 1 or 0 and can be evaluated for all possible values of m and $\tau$. The values of m and $\tau$ are fixed in any particular application. For m varying according to a chosen pattern there exists a solution for matrix $V(\tau)$ such that $U(t+\tau)$ may be determined but requiring a possible cyclic shift of the samples Z(t) depending on the position in the pattern of varying m.

For each storage element in the receiver PRBS register, the circuitry needed to perform the vector product of the row vector z(t) with the appropriate column in the coefficient matrix $V(\tau)$ implements a modulo-2 addition of all samples for which the column matrix coefficients are non-zero. $\tau$ may be selected to minimise the number of non-zero elements in the mapping matrix $V(\tau)$.

A special case where m=1 makes the mapping matrix become the identity matrix.

Figure 3:
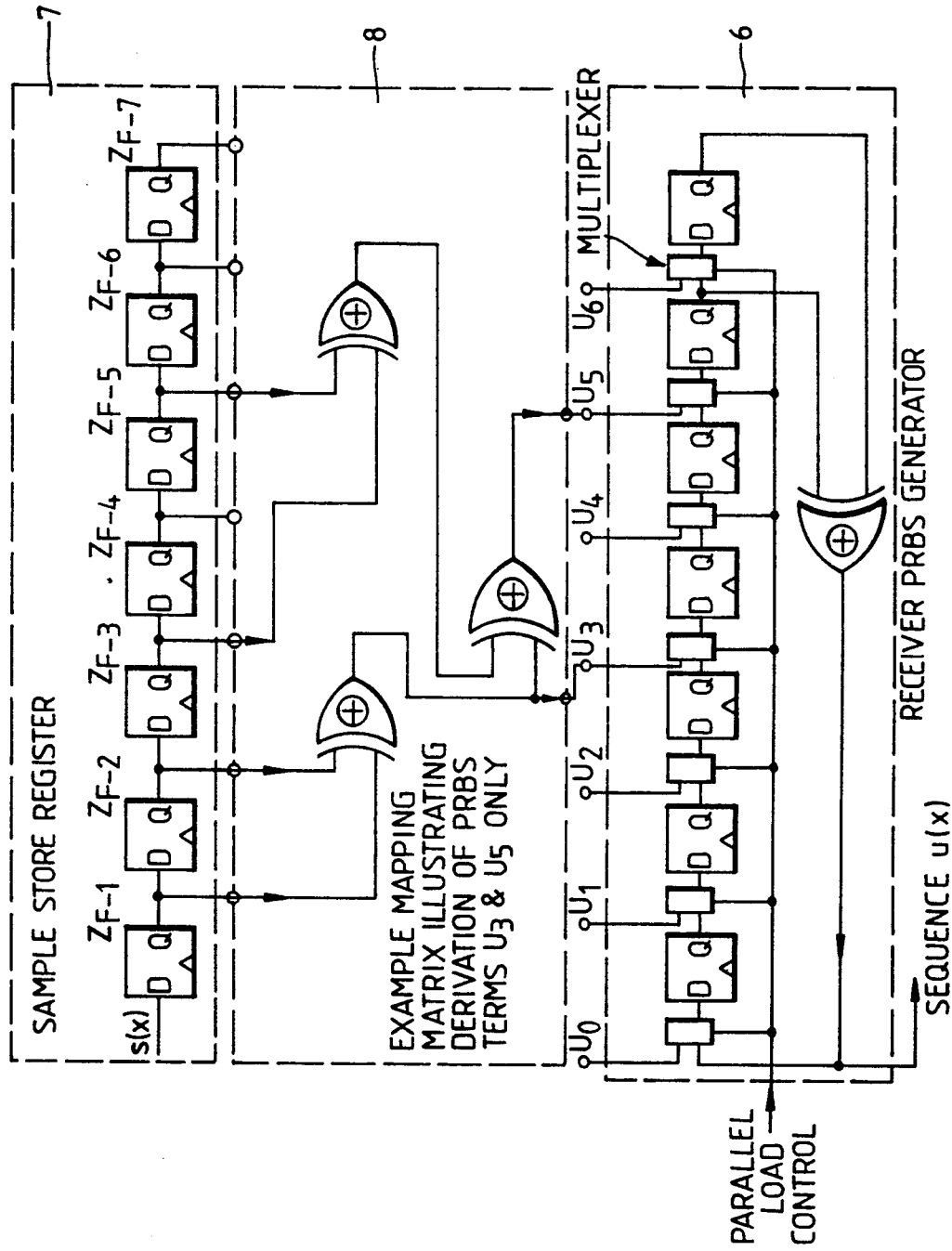
FIG. 3 illustrates apparatus for a synchronisation method which uses the direct relationship between the sampled values and the remote PRBS generator vector.

FIG. 3 depicts an implementation of mapping circuit assuming F=7. The sample store register 7 is a serial load shift register. The data s(x) is clocked in to the sample store register 10 one bit per frame L. On clocking the last element Z6 the parallel load control is enabled and the intended state of the PRBS generator 6 loaded. The PRBS generator is then clocked at the same rate as the incoming bit stream t(x). The PRBS output is checked to correspond with the sample data s(x) at the sampling times, for verifying PRBS synchronisation. The PRBS shift register is only reloaded if it is found that these do not consistently correspond. This provides resilience to bit transmission errors. It should be noted that the sample store register 7 and receiver PRBS generator 6 may share the same storage elements.

To calculate the coefficients of the mapping matrix $V(\tau)$, the following method may be used:

Write out the histories of each stage in the PRBS shift register in vertically spaced rows. Select those F columns spaced m apart to form an F×F matrix. Select those F columns, $\tau$ after the last column in the previous set to form the resultant F×F matrix. Then the rows of the mapping matrix $V(\tau)$ are defined by the F linear columns operations needed to transform the original set into the resultant set.

A second method, referred to as successive bit sample synchronisation, is to use each incoming bit in the sample sequence s(x) to overwrite the value of the feedback function f(x) at that moment it is received. This effectively synchronises the null sequence of the linear feedback shift register to produce that bit sample value at that moment and again after every complete cycle. To prevent bit samples from undoing the synchronisation achieved by earlier ones, the current values of each stage of the shift register have to be made consistent with all the samples collected thus far. The null sequence will be reliably synchronised after F valid bit samples have been inserted into the register in this manner.

Figure 4:
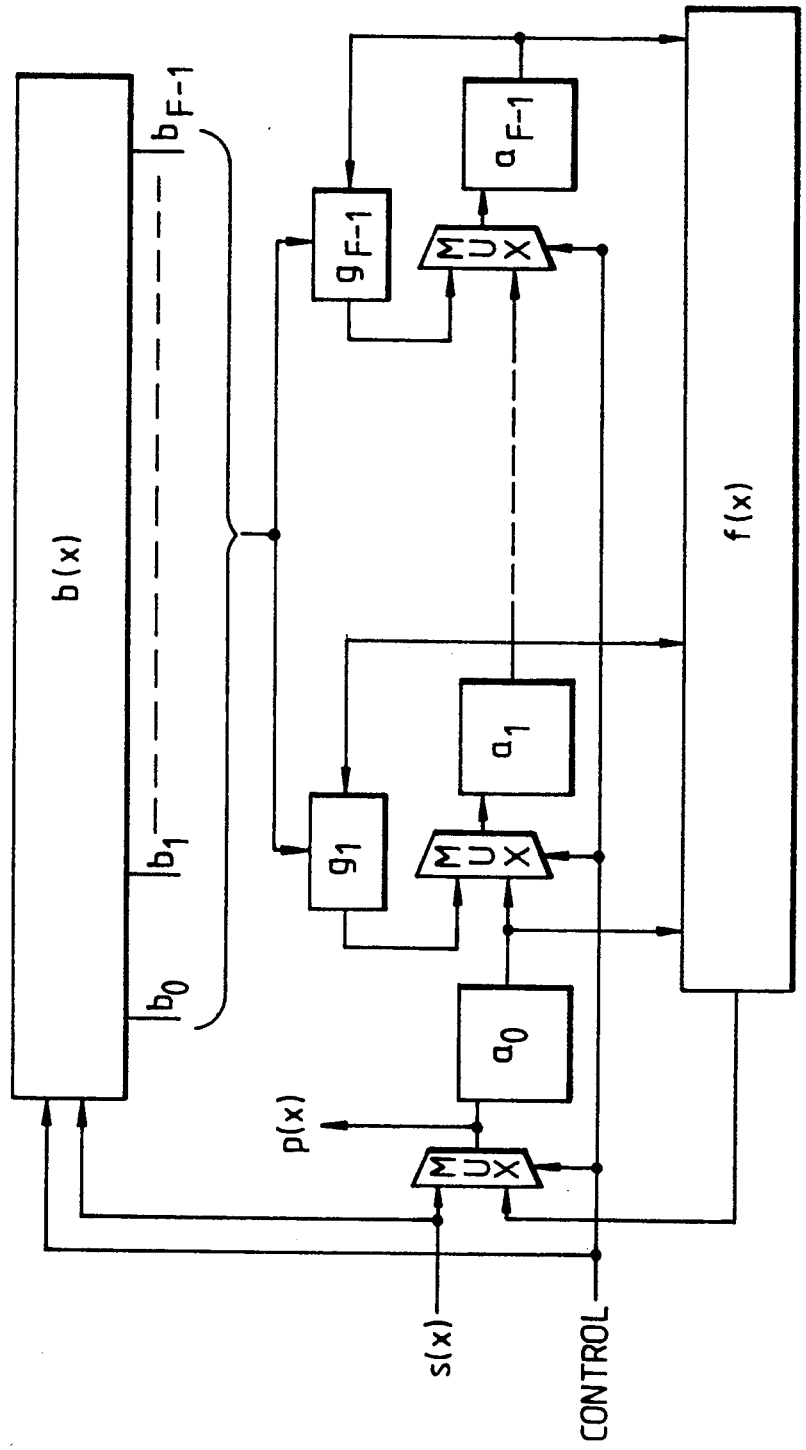
FIG. 4 illustrates apparatus for a successive bit sample synchronisation method.

FIG. 4 shows the general configuration of apparatus for an arbitrary length F shift register a(x) and linear feed back function f(x). The shift register b(x), also of length F, stores the last F null sequence bit samples s(x) and is shifted right by one position for each new sample. The linear combination functions $g_0 \ldots f_{F-1}$ calculate the values for each stage of the shift register a(x) that are to be consistent with all the samples to date. $g_0$ is a trivial term relating to the new bit arriving and no linear combinations are made therefrom. The periodic null sequence samples s(x) and the calculated consistent values $g_0(b(x), a_0) \ldots g_{F-1}(b(x), a_{F-1})$ are inserted into the shift register a(x) via a respective multiplexer preceding each stage of the register a(x), and selected by a control signal synchronised with the bit sample. The null sequence (PRBS) synchronised with the transmitter is obtained from point p(x).

In a specific application, the linear combination functions $g_0 \ldots g_{F-1}$ are calculated from the feedback function f(x) and the particular bit period m in between null sequence bit samples s(x). These functions $g_i$ would comprise exclusive-or gates. In practice several of these combination functions will be zero, which allows the elimination of its associated multiplexer.

The advantage of this method is that there is an opportunity to achieve synchronisation in less than F bit periods. This method is applicable to any combination of null sequence length and bit sample period.

A third method is referred to as null sequence offset calculation and synchronisation. This method collects F null sequence periodic bit samples and juxtaposes them to produce a vector. The vector is then used to calculate the offset between the receiver and transmitter null sequences and consequently achieve synchronisation after one sequence length.

It can be shown that there is a selection of F bit samples that when combined produce a vector that is identical to the vector in the transmitter sequence generator that produced the Fth incoming bit sample. For any maximal length linear feedback shift register, and a bit sample period m that is an integer power of 2, it can be shown that this selection of F samples is unique and calculable (denoted y(x)).

The period m between the incoming bit samples corresponds to m successive changes of vector in the transmitter sequence generator. However, each successive period m corresponds to a single change of the vector of the combined F bit samples. Therefore, the distance d of the combined vector z(x) from y(x), in terms of vector changes of the null sequence, indicates the distance (m−1)*d between the received combined vector z(x) and the vector of the transmitting sequence generator. The idea is to catch up this distance at the receiver by performing (m−1)*d vector changes and then wait unit the transmitter is again in this state. This will occur again one sequence after the Fth bit sample was received.

Figure 5:
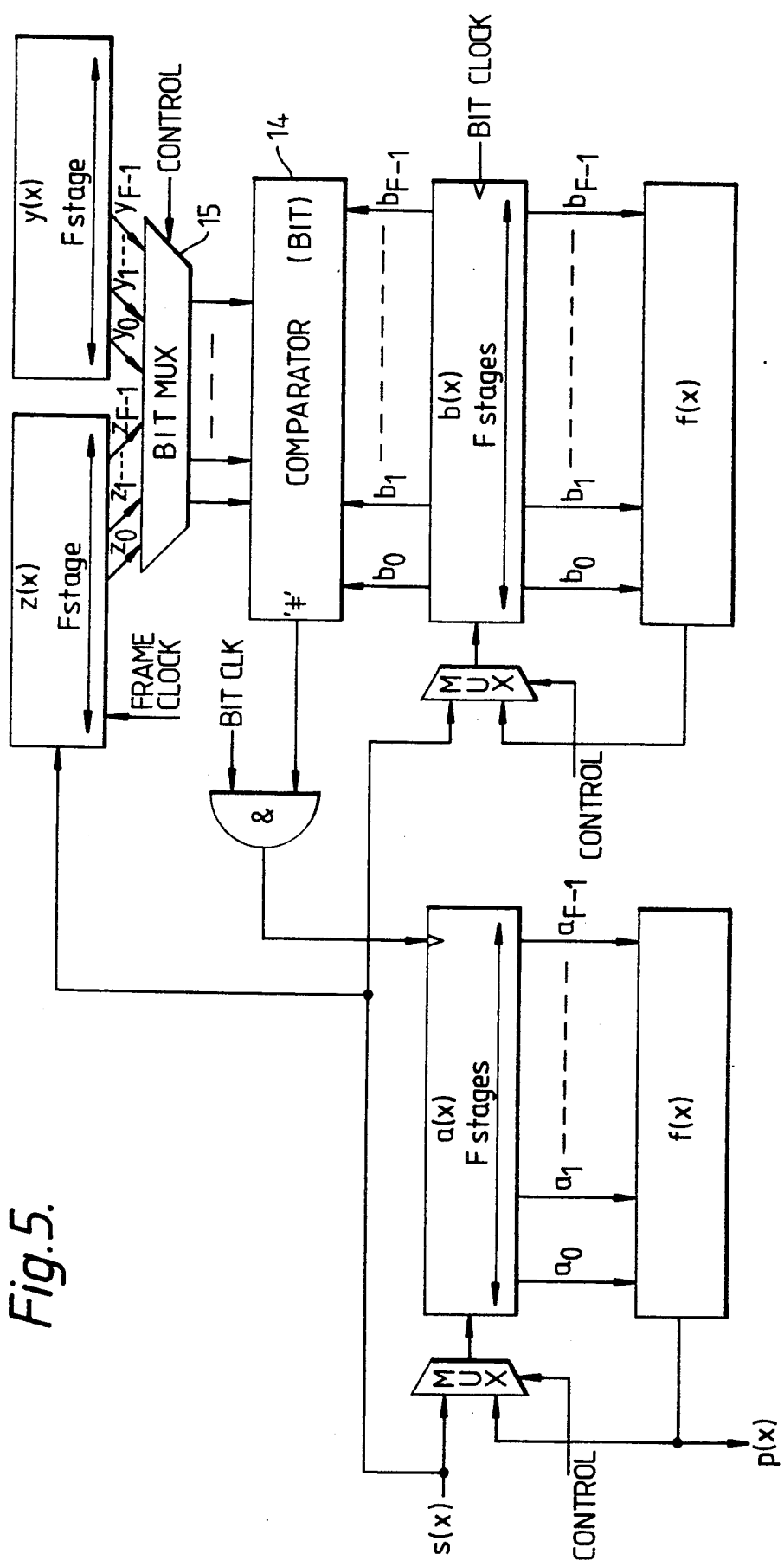
FIG. 5 illustrates apparatus for a null sequence offset calculation and synchronisation method.

FIG. 5 illustrates apparatus for performing this third method. It comprises two shift registers a(x) and b(x) with linear feedback functions f(x) and f⁻(x) respectively. f⁻(x) has the same number of coefficients as f(x) but they are reversed in order. i.e.

$$f(x) = f_0 + f_1 x + f_2 x^2 \ldots + f_{F-1} x^{F-1}$$

and $$f^-(x) = f_{F-1} + f_{F-2} x + F_{F-3} x^2 \ldots + f_0 x^{F-1}$$

The null sequence produced by the register b(x) is the reverse of that produced by register a(x). The incoming bits are shifted to the right into the registers a(x), b(x) and z(x). Register y(x) is preprogrammed and contains the unique corresponding vector as described above and is used to derive the offset between transmitter and receiver sequences.

The comparator 14 indicates inequality between its two operands. The comparison is between the vector in register b(x) and either of register y(x) or the combined vector of samples z(x). In the initial state it is used to compare register b(x) with register y(x). While the comparator indicates that these are not equal, both registers a(x) and b(x) are clocked at the bit rate from an initial state of the combined vector. Register a(x) steps forward through the vectors of the null sequence and register b(x) steps in the reverse direction. When register b(x) becomes equal to register y(x), register a(x) contains the vector that the transmitter sequence generator had when the Fth bit sample was received. At this point register a(x) has its clock disabled by the comparator 14, but register b(x) continues stepping backwards through the vector sequence. The transmitter will attain the vector in register a(x) again one complete null sequence length after the Fth bit was received. At the point register a(x) is disabled, the comparators multiplexer 15 is switched to now compare the vector in register b(x) with that in register z(x). Since z(x) is a vector of the F input samples, when register b(x) contains the identical vector, it will have gone through exactly one sequence length after the Fth bit was received and so has the sequence generator in the transmitter. At this stage the comparator output re-enables the clock of shift register a(x), which is now in synchronisation with the sequence generator in the transmitter.

When m=2, a(x) and f(x) are selected to form a normal linear feedback shift register. However, if m>2, then the sequence generator must be designed to step through the vectors of the null sequence, m−1 at a time. It is possible to construct a sequence generator to step through the vectors by any amount m−1, for 1<-m<n, where n is the sequence length. However, when synchronisation is achieved, the synchronisation vector calculated in register a(x) must be transferred into a normal linear feedback shift register, to generate a sequence in step with the transmitter. This could be achieved by reconfiguration of registers a(x) and f(x), or it could be achieved by the register b(x) if the coefficients of f⁻(x) are subsequently reversed, since this register becomes redundant when synchronisation is achieved.

Ideally the PRBS should be chosen to be maximal length. If the PRBS generator is not maximal length, then one state of the PRBS generator must be known by the receiver to ensure uniqueness. The cycle length of the PRBS must not be an integer multiple of the cell length nor the cell length an integer multiple of the PRBS, otherwise the sampled sequence will be of constant value and will not contain information sufficient to synchronise the receiver (second) PRBS generator.

Thus the invention as discussed so far discloses a method of locking the phase of a local pseudo random sequence generator to that of a remote pseudo random sequence generator. The method is particularly, but not exclusively, applicable to a system in which a remotely generated sequence has been modulo-2 added to a substantially unknown transmitted data sequence to randomise it. Use is made of periodically occurring known elements in the original data sequence to determine the unknown pseudo random sequence phase. Following framing of received data the position of the originally known elements is known and a sample version of the remote PRBS generator can be extracted and sample stream s(x) formed. This sample stream s(x) can be used in various ways to synchronise the local PRBS generator, for example as specifically described with reference to FIG. 3, FIG. 4, or FIG. 5. As mentioned above, previously proposed methods of recovering the phase of a modulo 2 added pseudo random sequence required the periodic resetting of the generator and the addition of a known synchronisation word of several bits. The technique proposed herein overcomes the need for periodic resets and permits the known data to be distributed on the basis of one bit per data block.

Whereas the invention as discussed above refers only to binary sequence generators the basic method and apparatus need not be so restricted, in fact it is applicable to any sequence generators obeying a generator polynomial whose coefficients and operators are defined over a Galois field, i.e. binary, ternary, quaternary and so on.

Figure 6:
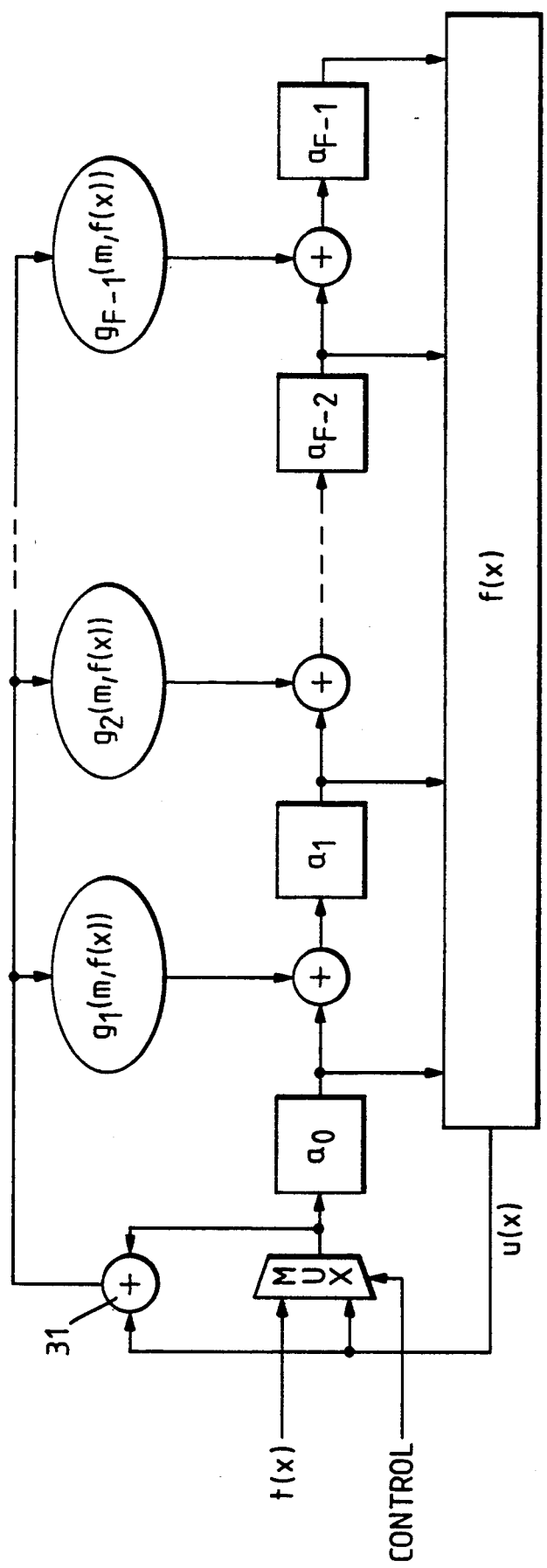
FIG. 6 illustrates an apparatus that comprises a linear feedback shift register (LFSR) with an ancillary mechanism for synchronisation with a LFSR at the transmitter, by using a known data value, in this example embodied in one bit per frame of data.

The apparatus of FIG. 6 is directly derived from FIG. 4, and implements the successive bit synchronisation method described therein.

A feature of this apparatus is that it eliminates the need for the sample store register, since it requires no memory of preceding samples of predictable bits in the incoming data stream.

A subsequent feature is that possibly errored samples no longer need be flushed from the memory of the sample store register, enabling faster possible error recovery, on the next or subsequent samples, rather that F samples after an error sample had been received.

The method has the ability to modify the phase of the receiver sequence in response to a modification in the phase of the transmitter sequence, according to non-predictable/predictable information known mutually to the transmitter and to the receiver, and maintain synchronisation, should a monitor facility be used to detect a string of data that could upset the transmission medium, one example being a long string of zeros.

A further feature is that the apparatus may dynamically adapt to an arbitrary change in the interval between samples—the interval being indicated by the frame delineation device or may adapt to a predetermined set of intervals between samples received in an arbitrary order of intervals, or may be fixed to accept just one interval between samples. For example this may be an empty cell in the case of ATM transmission, wherein the contents of such a cell are fixed and known. This capability permits several samples to be obtained from each frame if necessary, and therefore speed up the time to achieve synchronisation. The criterion for achieving synchronisation for a generator polynomial of degree F, is that F linearly independent samples are required for reliable synchronisation by the receiver, although in practice, synchronisation may be obtained in fewer than F samples.

Several samples may be taken from an error protected field—e.g. if the framing information were a check sum over a field as in Application No. 8910255.2 indicating the integrity of the samples, thus improving the resilience to errors in the transmission medium.

FIG. 6 depicts a linear feedback shift register arrangement, although a feed forward or other generator implementations apply equally.

The feedback function may be any suitable sequence generator polynomial, not necessarily restricted to the generation of maximal length sequences.

If scrambling is not in use at the transmitter the predictable data values would remain unchanged in transmission and therefore yield a sample which has the property of inhibiting the receiver generator, thereby automatically detecting the presence/absence of scrambling, and switching the generator off in the receiver.

In the figure f(x) is the polynomial for generating the sequence, and comprises and exclusive-or operation (or equivalent logic) for each non-zero coefficient of x in the polynomial, as known to those skilled in the art.

The blocks, $a_0 \ldots a_{F-1}$ form the stages of a shift register clocked at the incoming data rate. There may be an exclusive-or operation inserted between each shift register stage according to the coefficients "g" described later herein, that permits the shifted bit to be modified according to the incoming sample at the known bit position. The signal t(x) is the incoming data stream, and the signal "control" operates the multiplexer whenever a valid sample may be taken from the stream t(x), according to a frame delineation device or a sample position predictor device.

The signal u(x) is the output of the function f(x), that is the scrambler sequence to be synchronised with that in the transmitter. The blocks $g_1(m,f(x)) \ldots g_{F-1}(m,f(x))$ are coefficients in the same Galois field as those coefficients of f(x), according to the sample interval 'm' and the polynomial f(x), which 'm' may be fixed in a given application, thereby fixing the coefficients, or which coefficients may be calculated dynamically according to f(x) and the last interval between samples, or, which coefficients may be switched between a closed set of values according to the last interval between samples, for some predesignated closed set of intervals 'm'. Additionally these coefficients $g_1(m,f(x)) \ldots g_{F-1}(m,f(x))$ may be predetermined or, dynamically, calculated to synchronise the receiver generator for an time $\tau$ relative to the transmitter sequence phase.

For any combination of m and f(x), the coefficients $g_1(m,f(x)) \ldots g_{F-1}(m,f(x))$ are unique, and exist for all m that is not a factor of $2^{F-1}$, which divides $Z^{F-1}$ by an integer value less than F.

In normal operation the multiplexer directs the signal u(x) into the first stage $a_0$ of the shift register. The exclusive-or operation 31, measures the difference between u(x) and the input to stage $a_0$, and since these are identical in normal operation, causes no effect on the other contents of the register via coefficients $g_1(m,f(x)) \ldots g_{F-1}(m,f(x))$.

When taking a sample, the control switches the multiplexer to direct signal t(x) into the first stage $a_0$ of the shift register. Operation 31, measures the difference between this sample and the sequence u(x), and via coefficients $g_1(m,f(x)) \ldots g_{F-1}(m,f(x))$, can modify the other contents of the register $a_0 \ldots a_{F-1}$ for consistency with the value of the sample and previous samples. In this manner, the receiver sequence converges on synchronisation with the transmitter sequence for each sample that is linearly independent from preceding samples.

If there is no difference between samples and the signal u(x) at these sample positions, on several consecutive valid samples, then the receiver is considered synchronised, and the control can be inhibited from further operation.

As an example of implementation for F=9, the following is a description of the operation and verification of synchronisation for the framing locator and descrambler, based on there being one bit in the header of each frame (for cell read frame).

A further feature of this example that applies equally in general for any predictable data value, is the use of the known data bit to also indicate one of two possible intervals for two lengths of frame (18 & 54 bytes), it being inverted in a short frame. The two sets of coefficients $g_1(432, f(x)) \ldots g_{F-1}(432,f(x))$ and $g_1(144,f(x)) \ldots g_{F-1}(144,f(x))$ are designed to synchronise the sequence for $\tau=144$, i.e. 144 bits advanced.

During start up and resynchronisation, whilst the cell header locator continues to locate valid cell headers prior to its own synchronisation, valid samples are taken from the cell header in the known bit location. If the header locator receives a corrupted header, or is currently hunting for the first valid header, the descrambler can freewheel, but no valid samples are being taken.

The descrambler stores the difference between the incoming sample and the descrambler fed back bit (the output of ex-or operation 31 in the preceding description) for each valid header, for use 144 bits (18 bytes) later (when the length of the current cell can be first determined). The length of the previous cell is also stored, so that the coefficients $g_1$-$g_{F-1}$ corresponding to that interval can be determined later.

Each 18 byte time interval after the last valid cell header, the presence of a valid cell header indicates the cell was the shorter of the two lengths, in which case the known data value had been inverted and this indication is used in combination with the stored difference value, and are exclusive-ored together to provide verification information and thus a corrected difference signal. The corrected difference signal and stored last cell length indication, control the application of the selection of the two sets of coefficients to the descrambler register contents.

The descrambler verification count is only incremented when the following conditions hold:
a valid cell header has been received and also valid verification of the signal u(x) with the sample i.e. no difference.
If the verification fails, then the count is reset and synchronisation continues. When the verification count reaches 9, the descrambler is synchronised.

During steady state operation the difference signal between the fed back bit and the sample determines the length of the current cell i.e. this value is now able to be descrambled.

Figure 7:
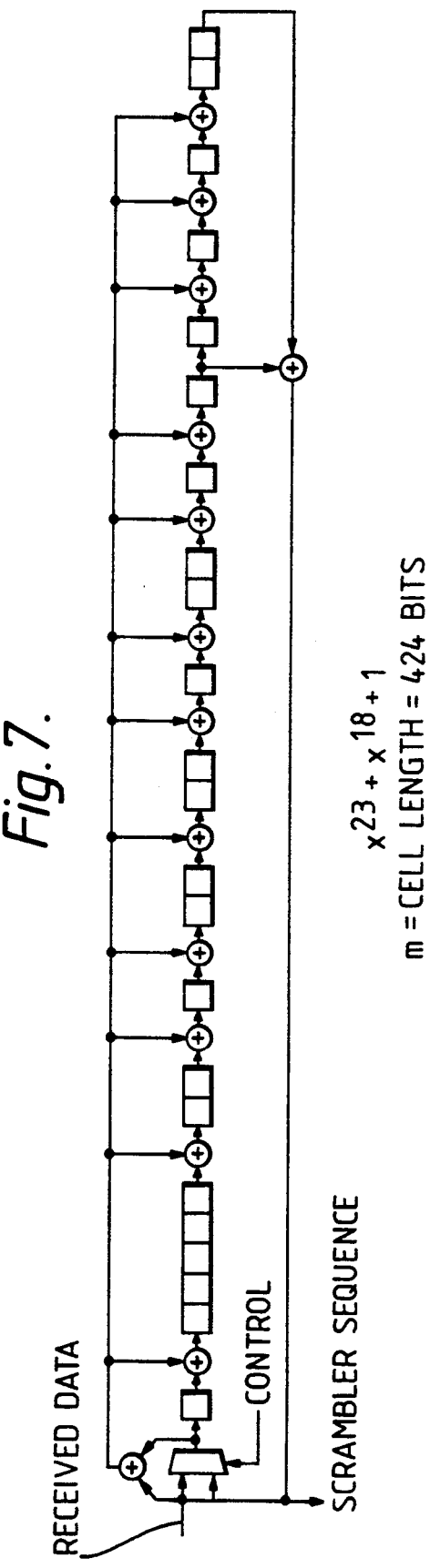
FIG. 7 depicts a further example implementation.

The value of $\tau=144$ compensates the storage of the sample difference signal for 144 bits i.e. a short cell length FIG. 7 depicts a further example implementation for an $f(x)=x^{23}+x^{18}+1$, $m=424$ for a fixed cell length of 424 bits. In this example, the coefficients $g_1(m,f(x))\ldots g_{F-1}(m, f(x))$ are thus fixed, and for those zero coefficients, the exclusive-or operation is redundant and have been removed from between the shift register stages.

Figure 8:
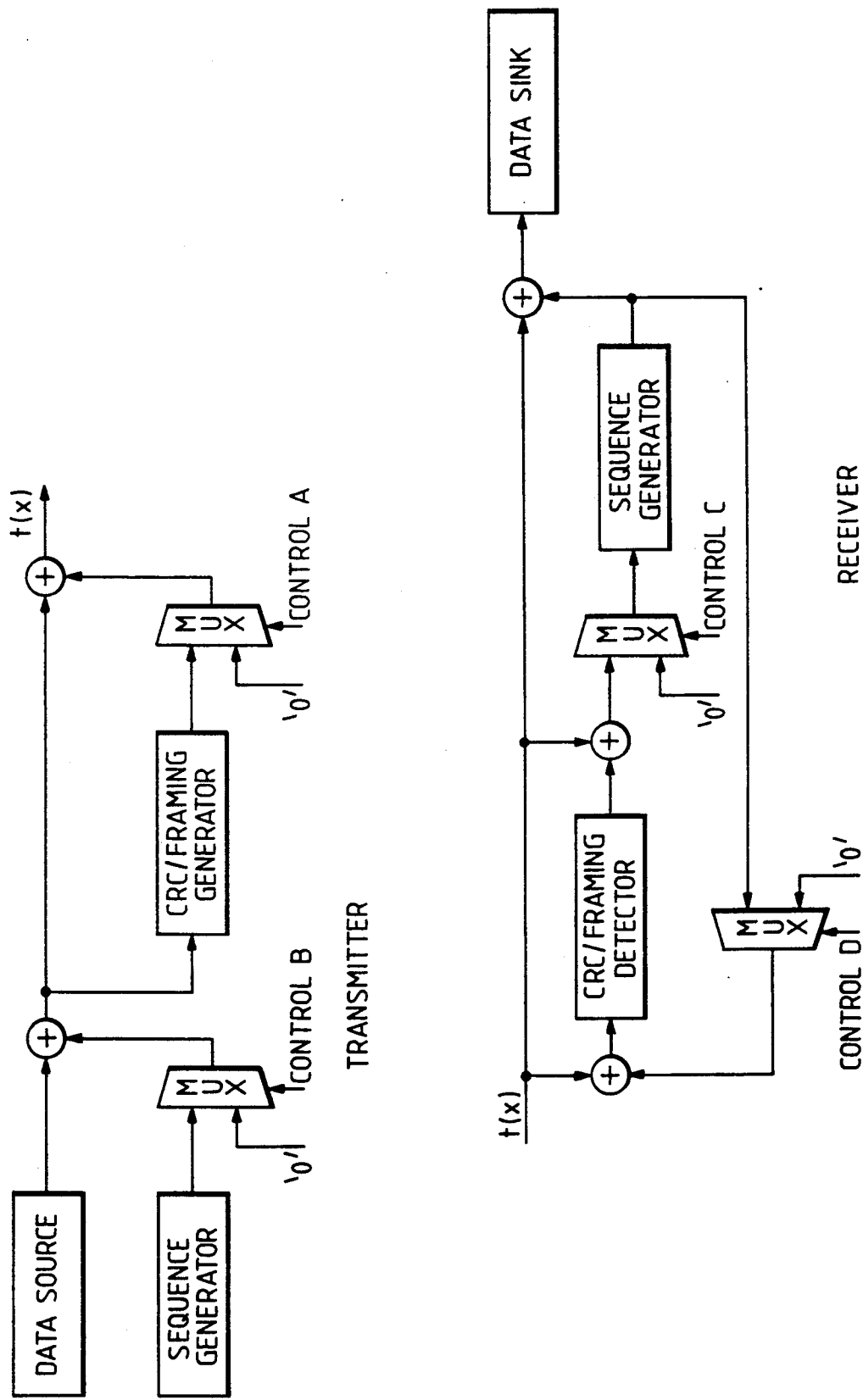
FIG. 8 illustrates another example implementation.

The following is a description of an apparatus/method (FIG. 8), which includes methods and apparatus described in Application No. 8910255.2 for frame synchronisation, or may use other framing methods whose framing information constitutes predictable values, and which includes apparatus and methods described in above for sequence synchronisation.

A scrambling sequence may be added to a data stream continuously or over controlled intervals. The resultant sequence may be framed by the addition of framing information, or by using the method described in Application 8910255.2 at controlled intervals, which may coincide with the intervals of the scrambler. The resultant sequence is transmitted to the receiver.

At the receiver a second descrambler must be synchronised to that of the transmitter. The incoming sequence may be framed by a framing detector employing the same method of framing information as at the transmitter. The framing detector is part of a feedback loop with the second scrambler and both may achieve their corresponding synchronisation concurrently. To a man skilled in the art the operation may be considered analogous to a phase locked loop. The framing detector assumes the position for the framing information, and uses this information to extract samples to synchronise the scrambler. The output sequence of said scrambler is used by the framing detector to correlate subsequent positions for the framing information, achieving a stable synchronisation when correlation is achieved after a set number of frames.

When the scrambler at the transmitter is deployed in a continuous manner, each frame's framing information is scrambled and the receiver achieves synchronisation as described above. However, if the scrambler is turned off for certain frame's framing information, in a repeating pattern of on an off states, the receiver may also detect this pattern and use a correlation technique to achieve synchronisation and verification of synchronisation.

Figure 9:
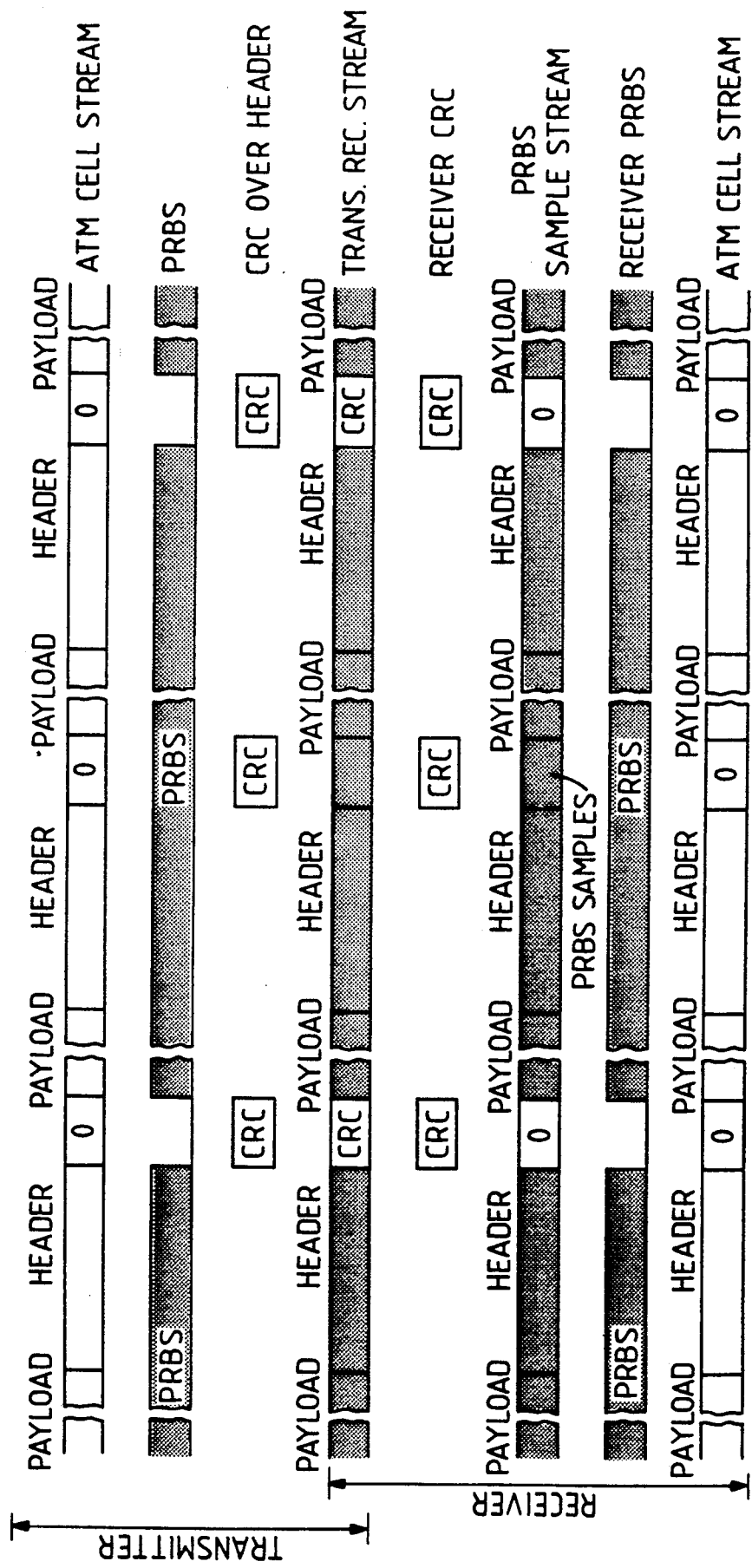
FIG. 9 illustrates yet another example implementation.

In the following example (FIG. 9) the method is ideally suited to ATM cell transmission. Each cell has a header over which a check sum is calculated by a cyclic redundancy check (CRC). The CRC may be used for cell delineation by the technique described in Application No. 8910255.2. The payload and the header are added to a PRBS to allow such mechanisms as bit clock extraction to be performed at a receiver. The CRC is calculated on the scrambled bits of the header and added modulo-2 to the last 8 bits of the header, prior to the cell payload. By way of a multiplexer on the PRBS output (control B FIG. 8) none, some or all of the cell headers may contain scrambled CRC fields by this addition.

A preferred implementation is when each alternate header CRC is scrambled. In this manner cell delineation may have an identical operation to that described in Application No. 8910255.2, other than that the interval between headers with non-scrambled CRC is twice as long. Therefore cell delineation would require twice as many cells as normal.

The scrambled CRCs are identified when cell delineation is being acquired, by the mid point between valid cell headers with unscrambled CRCs. By calculating the CRC field locally at the receiver over the scrambled header bits, 8 PRBS samples may be extracted from these headers by a modulo-2 addition of the local CRC bits and the received bits. The PRBS generator of the receiver uses the 8 samples received every alternate cell to synchronise to that in the transmitter using an apparatus as described above, those of FIGS. 6 and 7 are preferred.

Once the receiver PRBS synchronisation has been verified, it may be used to unscramble the data stream and also check the CRC on every incoming alternate cell, in addition to CRCs which were not originally scrambled.

Figure 10:
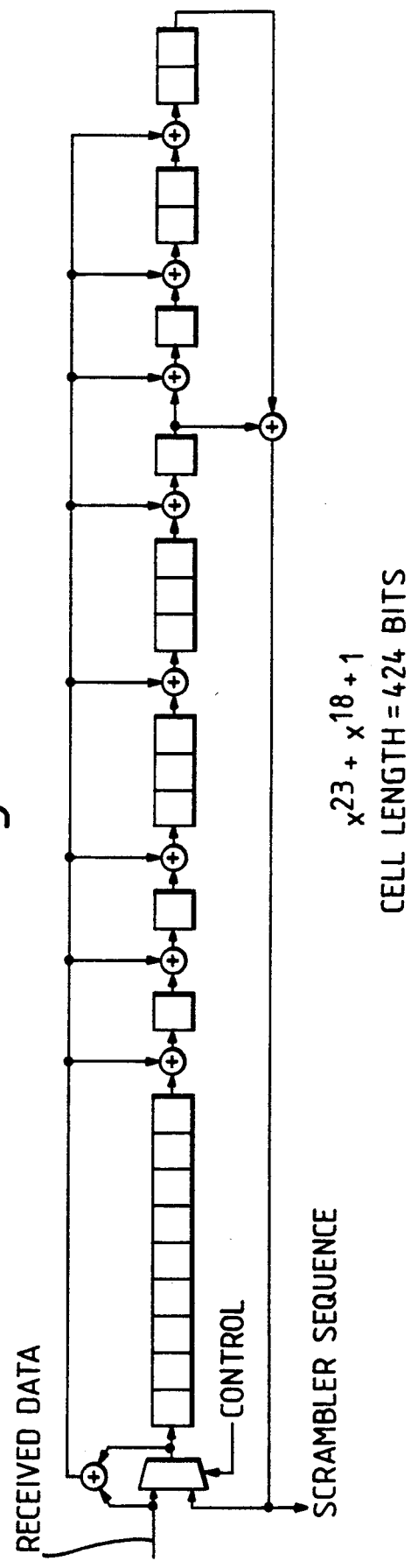
FIG. 10 depicts an apparatus for synchronising the receiver PRBS.

FIG. 10 depicts the apparatus for synchronising the receiver PRBS based on a cell length of 424 bits, an $x^{23}+x^{18}+1$ scrambler polynomial, and 8 CRC bits per cell header, with each alternate header having a scrambled CRC field.

We claim:

1. A method of synchronizing a first sequence generator, obeying a generator polynomial whose coefficients and operators are defined over a Galois field, disposed at a data receiver with a second identical sequence generator disposed at a data transmitter, including the steps of adding the sequence produced by the second generator to a data stream for transmission to the data receiver, which data stream includes a predictable data value at intervals, transmitting the data stream with the added sequence from the data transmitter to the data receiver, at the data receiver receiving the transmitted data stream with the added sequence and framing the received data stream with the added sequence and thus determining the interval and the positions of the predictable data value, and sampling the received data stream with the added sequence at said predictable data value positions, said sampling producing a resultant sequence of samples comprising a sampled version of the sequence produced by the second generator, and determining the phase of the second generator from the sequence of samples and adjusting the phase of the first generator to correspond to that of the second generator by storing the sequence of samples as a first vector in a register, generating a mapping matrix, and multiplying the first vector by the mapping matrix to produce a further vector for a future time $t+\tau$ such that after time $\tau$ the first generator can be clocked continuously in synchronization with that of the second generator, and wherein for generating the coefficients of the mapping matrix the following method is used, write out the histories of the values of storage elements of each stage of a shift register of the first generator in respective vertically spaced rows, with the values of the storage elements for all of the stages of the shift register at particular times aligned in columns, select F of said columns (where F is the degree of the generator polynomial) spaced m (where m is the interval) apart to form an original F×F matrix, and select those F of said columns τ after the last column in the original matrix to form a resultant F×F matrix, the rows of coefficients of the mapping matrix being defined by the F linear column operations needed to transform the original matrix into the resultant matrix, which method of synchronizing serves also for automatically determining at said data receiver whether said data transmitter has applied its sequence generator, since if said data transmitter is not applied the predictable data values will be unchanged in transmission.

2. A method as claimed in claim 1 wherein the generators are pseudo random binary sequence generators and the predictable data value comprises one bit.

3. A method as claimed in claim 2 wherein the data stream is in the form of cells of uniform length L bits, which cells include a header of length n bits and a payload of length j bits, wherein the predictable one bit is the ith bit in the header from the start of a cell, which header also includes null information where cyclic redundancy code (CRC) bits can be overwritten, and including the step of overwriting said null information with CRC bits prior to transmission of the data stream with the added sequence to the data receiver.

4. A method as claimed in claim 3 wherein at the data receiver the CRC is employed for framing the received data stream with the added sequence.

5. A method as claimed in claim 1 wherein the data stream includes a predictable data value at intervals and framing information at intervals, which framing information constitutes a respective predictable data value, and including concurrently performing the steps of statistically framing the received data stream with the added sequence and determining the phase of the second generator and sampling the received data stream frame information, and thus determining the interval and positions of the predictable data values.

6. A method of synchronizing a first sequence generator, obeying a generator polynomial whose coefficients and operators are defined over a Galois field, disposed at a data receiver with a second identical sequence generator disposed at a data transmitter, including the steps of adding the sequence produced by the second generator to a data stream for transmission to the data receiver, which data stream includes a predictable data value at intervals, transmitting the data stream with the added sequence from the data transmitter to the data receiver, at the data receiver receiving the transmitted data stream with the added sequence and framing the received data stream with the added sequence and thus determining the interval and the positions of the predictable data value, and sampling the received data stream with the added sequence at said predictable data value positions, said sampling producing a resultant sequence of samples comprising a sampled version of the sequence produced by the second generator, and determining the phase of the second generator from the sequence of samples and adjusting the phase of the first generator to correspond to that of the second generator by employing successive digit sampling synchronization wherein each incoming digit in the sequence of samples is used to overwrite the value of a feedback function, at the moment it is received, via a linear operator means, which method serves also for automatically determining at said data receiver whether said data transmitter has applied its sequence generator, since it said data transmitter is not applied to the predictable data values will be unchanged in transmission.

7. A method as claimed in claim 6 wherein the generators are pseudo binary sequence (PRBS) generators and the predictable data value comprises one bit.

8. A method as claimed in claim 7 wherein the data stream is in the form of cells of uniform length L bits, which cells include a header of length n bits and a payload of length j bits, wherein the predictable one bit is the ith bit in the header from the start of a cell, which header also includes null information where cyclic redundancy code (CRC) bits can be overwritten, and including the step of overwriting said null information with CRC bits prior to transmission of the data stream with the added sequence to the data receiver.

9. A method as claimed in claim 8 wherein at the data receiver the CRC is employed for framing the received data stream with the added sequence.

10. A method as claimed in claim 8 wherein the header null information of each cell is overwritten by CRC bits and alternate overwritten header CRC bits are scrambled by the addition of the sequence produced by the second generator.

11. A method as claimed in claim 10 wherein the CRC is calculated on the scrambled bits of the header and added modulo-2 to the last eight bits of the header prior to the cell payload, and wherein at the receiver the CRC field is calculated locally over the scrambled header bits, eight PRBS samples being extracted from the alternate cells.

12. A method as claimed in claim 1 including the steps of applying the incoming bits of the sequence of samples to each stage successively of a first linear shift register of length F (where F is the degree of the generator polynomial) via a respective multiplexer, storing the previous F sequence samples in a second linear shift register of length F, employing the linear operator means to calculate by linear combinations and using the feedback function, the values of the stages of the first linear shift register which are consistent with the previous sequence samples, inserting the calculated consistent values into the stages of the first linear shift register via the respective multiplexer in dependence on a control signal synchronized with the bit sample, a receiver sequence synchronized with that of the transmitter being produced at a node between the first stage of the first linear shift register and the preceding respective multiplexer.

13. A method as claimed in claim 7 including the steps of, in dependence on a control signal, either applying the sequence of samples received from the second generator or applying the first generator sequence, which is the output of the feedback function, to a first linear shift register of length F (where F is the degree of the generator polynomial) via a first multiplexer, the control signal being provided when a valid sample may be taken from the received data stream with the added sequence and the multiplexer then applying the sequence of samples received from the second generator to the first shift register, in the absence of the control signal the first generator sequence is applied to the first linear shift register, and wherein when the sequence of samples received from the second generator is applied to the first linear shift register, measuring the difference between the sequence of samples received from the second generator and the first generator sequence and employing the difference to modify the shift register contents via the linear operator means for consistency with the sample and previous samples whereby to cause the first generator sequence to converge on synchronization with the sequence of samples received from the second generator.

14. A method as claimed in claim 13 wherein the linear operator means employ coefficients according to the sample interval and the generator polynomial, and wherein the sample interval is one of the set comprising, a sample interval which is fixed for a particular application, a sample interval which is calculated dynamically according to the last interval between samples, and a sample interval which is switched between a closed set of values according to the last interval between samples, and the method further including correspondingly fixing the sample interval, calculating the sample interval dynamically, and switching the sample interval between said closed set of values.

15. A method as claimed in claim 6, wherein the data stream includes a predictable data value at intervals and framing information at intervals, which framing information constitutes a respective predictable data value, and including concurrently performing the steps of statistically framing the received data stream with the added sequence and determining the phase of the second generator and sampling the received data stream framing information, and thus determining the interval and positions of the predictable data values.

16. A method of synchronizing a first sequence generator, obeying a generator polynomial whose coefficients and operators are defined over a Galois field, disposed at a data receiver with a second identical sequence generator disposed at a data transmitter, including the steps of adding the sequence produced by the second generator to a data stream for transmission to the data receiver, which data stream includes a predictable data value at intervals, transmitting the data stream with the added sequence from the data transmitter to the data receiver, at the data receiver receiving the transmitted data stream with the added sequence and framing the received data stream with the added sequence and thus determining the interval and the positions of the predictable data value, and sampling the received data stream with the added sequence at said predictable data value positions, said sampling producing a resultant sequence of samples comprising a sampled version of the sequence produced by the second generator, and determining the phase of the second generator from the sequence of samples and adjusting the phase of the first generator to correspond to that of the second generator by collecting F (where F is the degree of the generator polynomial) sequence samples and juxtaposing them to produce a vector, using the vector to calculate the offset between the receiver and transmitter generator sequence and reducing the offset step by step until the generator sequences are synchronized, which method serves also for automatically determining at said data receiver whether said data transmitter has applied its sequence generator, since if said data transmitter is not applied the predictable data values will be unchanged in transmission.

17. A method as claimed in claim 16 wherein the generators are pseudo random binary generators and the predictable data value comprises one bit.

18. A method as claimed in claim 17 wherein the data stream is in the form of cells of uniform length L bits, which cells include a header of length n bits and a payload of length j bits, wherein the predictable one bit is the ith bit in the header from the start of a cell, which header also includes null information where cyclic redundancy code (CRC) bits can be overwritten, and including the step of overwriting said null information with CRC bits prior to transmission of the data stream to the receiver.

19. A method as claimed in claim 18 wherein at the data receiver the CRC is employed for framing the received data stream with the added sequence.

20. A method as claimed in claim 16, wherein the data stream includes a predictable data value at intervals and framing information at intervals, which framing information constitutes a respective predictable data value, and including concurrently performing the steps of statistically framing the received data stream with the added sequence and determining the phase of the second generator and sampling the received data stream with the added sequence framing information, and thus determining the interval and positions of the predictable data values.

21. Apparatus for synchronizing a first sequence generator, obeying a generator polynomial whose coefficients and operators are defined over a Galois field, disposed at a data receiver with a second identical sequence generator disposed at a data transmitter, including means for adding the sequence produced by the second generator to a data stream for transmission from the data transmitter to the data receiver, which data stream includes a predictable data value at intervals, which data transmitter transmits the data stream with the added sequence to the data receiver, means at the data receiver for framing the received data stream with the added sequence and thus determining the interval and the positions of the predictable data value, means for sampling the received data stream with the added sequence at said determined positions of the predictable data value, the resultant sequence of samples comprising a sampled version of the sequence produced by the second generator, means for determining the phase of the second generator from the sequence of samples and means for adjusting the phase of the first generator to correspond to that of the second generator, and wherein the phase determining and adjusting means includes storage means for storing the sequence of samples as a first vector, means for generating a mapping matrix and means for multiplying the first vector by the mapping matrix whereby to produce a further vector for a future time $t+\tau$ such that after time $\tau$ the first generator can be clocked continuously in synchronization with that of the second generator, and wherein the mapping matrix generating means comprises means for generating the coefficients of the mapping matrix including means for writing out the histories of the values of storage elements of each stage of a shift register of the first generator in respective vertically spaced rows with the values of the storage elements for all of the stages of the shift register at particular times aligned in columns, means for selecting F of said columns (where F is the degree of the generator polynomial) spaced m apart (where m is the interval) to form an original $F \times F$ matrix, means for selecting F of said columns $\tau$ after the last column in the original matrix to form a resultant $F \times F$ matrix, the rows of coefficients of the mapping matrix being defined by the F linear column operations needed to transform the original matrix into the resultant matrix.

22. A method as claimed in claim 21 wherein the generators are pseudo random binary generators and the predictable data value comprises one bit.

23. Apparatus for synchronizing a first sequence generator, obeying a generator polynomial whose coefficients and operators are defined over a Galois field, disposed at a data receiver with a second identical sequence generator disposed at a data transmitter, including means for adding the sequence produced by the second generator to a data stream for transmission from the data transmitter to the data receiver, which data stream includes a predictable data value at intervals, which data transmitter transmits the data stream with the added sequence to the data receiver, means at the data receiver for framing the received data stream with the added sequence and thus determining the interval and the positions of the predictable data value, means for sampling the received data stream with the added sequence at said determined positions of the predictable data value, the resultant sequence of samples comprising a sampled version of the sequence produced by the second generator, means for determining the phase of the second generator from the sequence of samples and means for adjusting the phase of the first generator to correspond to that of the second generator, and wherein the phase determining and adjusting means employs successive digit sampling synchronization whereby each incoming digit in the sequence of samples is used to overwrite the value of a feedback function, at the moment it is received, via linear operator means.

24. A method as claimed in claim 23 wherein the generators are pseudo random binary sequence (PRBS) generators and the predictable data value comprises one bit.

25. Apparatus as claimed in claim 24 including a first linear shift register of length F (where F is the degree of the generator polynomial) to the stages of which the incoming bits of the sequence of samples are applied successively via a respective multiplexer, a second linear shift register of length F for storing the previous F sequence samples, the linear operator means in use of the apparatus serving to calculate, using the feedback function, the values of the stages of the first linear shift register which are consistent with the previous sequence samples, and to insert the calculated consistent values into the stages of the first linear shift register via the respective multiplexer in dependence on a control signal synchronized with the bit sample, whereby a receiver sequence synchronized with that of the transmitter is produced at a node between the first stage of the linear shift register and the preceding respective multiplexer.

26. Apparatus as claimed in claim 24 including a first linear shift register of length F (where F is the degree of the generator polynomial), a first multiplexer having an input for the data stream with the added sequence received from the data transmitter, an input from the first generator, which is the output of the feedback function, and a control port, in use a control signal being provided at the control port when a valid sample may be taken from the received data stream with the added sequence and the multiplexer then applies the sequence of samples received from the second generator to the first shift register, in the absence of the control signal the first generator sequence is so applied, means for measuring the difference value between the sequence of samples received from the second generator and the first generator sequence when the control signal is provided, and means for applying the difference value to the linear operator means, which operator means serve to modify the first shift register contents for consistency with the sample and previous samples whereby to cause the first generator sequence to converge on synchronization with the second generator sequence.

27. Apparatus for synchronizing a first sequence generator, obeying a generator polynomial whose coefficients and operators are defined over a Galois field, disposed at a data receiver with second identical sequence generator disposed at a data transmitter, including means for adding the sequence produced by the second generator to a data stream for transmission from the data transmitter to the data receiver, which data stream includes a predictable data value at intervals, which data transmitter transmits the data stream and the added sequence to the data receiver, means at the data receiver for framing the received data stream with the added sequence and thus determining the interval and the positions of the predictable data values, means for sampling the received data stream with the added sequence at said determined positions of the predictable data values, the resultant sequence of samples comprising a sampled version of the sequence produced by the second generator, means for determining the phase of the second generator from the sequence of samples and means for adjusting the phase of the first generator to correspond to that of the second generator, and wherein the phase determining and adjusting means include means for collecting F (where F is the degree of the generator polynomial) sequence samples and juxtaposing them to produce a vector, means to calculate the offset between the receiver and transmitter generator sequences using the vector, and means to reduce the offset step by step until the generator sequences are synchronized.

28. Apparatus as claimed in claim 27 wherein the generators are pseudo random binary sequence generators and the predictable data value comprises one bit.

* * * * *